US011868528B2

(12) United States Patent
Meyer et al.

(10) Patent No.: US 11,868,528 B2
(45) Date of Patent: Jan. 9, 2024

(54) METHOD FOR A USER ACTIVITY RECOGNITION FOR DATA GLASSES, AND DATA GLASSES

(71) Applicant: Robert Bosch GmbH, Stuttgart (DE)

(72) Inventors: Johannes Meyer, Magstadt (DE); Thomas Alexander Schlebusch, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/162,980

(22) Filed: Feb. 1, 2023

(65) Prior Publication Data
US 2023/0251708 A1 Aug. 10, 2023

(30) Foreign Application Priority Data
Feb. 9, 2022 (DE) .................... 10 2022 201 351.4

(51) Int. Cl.
*G06F 3/01* (2006.01)
*G02B 27/01* (2006.01)

(52) U.S. Cl.
CPC .......... *G06F 3/013* (2013.01); *G02B 27/017* (2013.01); *G02B 2027/0138* (2013.01); *G02B 2027/0178* (2013.01)

(58) Field of Classification Search
CPC . G06F 3/013; G06F 3/01; G06F 3/011; G02B 27/017; G02B 2027/0138; G02B 2027/0178; G02B 27/01
See application file for complete search history.

(56) References Cited

U.S. PATENT DOCUMENTS

| 2015/0070389 | A1* | 3/2015 | Goto ................ G06T 7/00 345/633 |
| 2019/0279407 | A1* | 9/2019 | McHugh ............ G06F 3/011 |
| 2021/0110596 | A1* | 4/2021 | Ishikawa ............ G06F 3/011 |
| 2022/0337780 | A1* | 10/2022 | Huang ............... H04N 7/142 |

* cited by examiner

*Primary Examiner* — Pegeman Karimi
(74) *Attorney, Agent, or Firm* — NORTON ROSE FULBRIGHT US LLP; Gerard A. Messina

(57) ABSTRACT

A method for a user activity recognition for data glasses. The data glasses include at least one integrated sensor unit. An activity of a user of the data glasses is recognized, via an evaluation of data that are detected by the integrated sensor unit, in at least one user activity recognition step carried out by a classifying unit. It is provided that when the user activity recognition step is carried out, the classifying unit takes into account information that has been ascertained in a (preferably) user-specific training step chronologically preceding the user activity recognition step, by training the classifying unit.

11 Claims, 2 Drawing Sheets

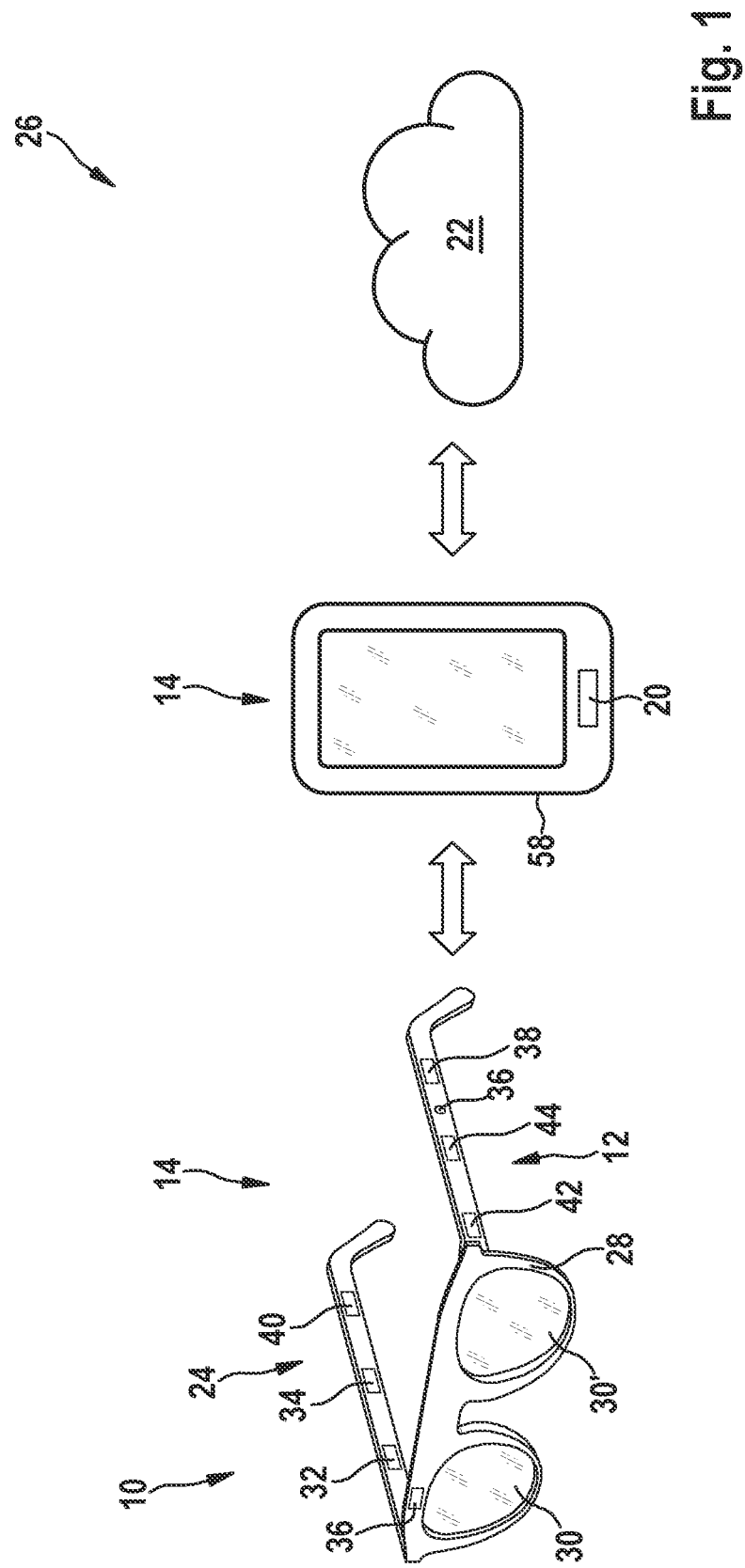

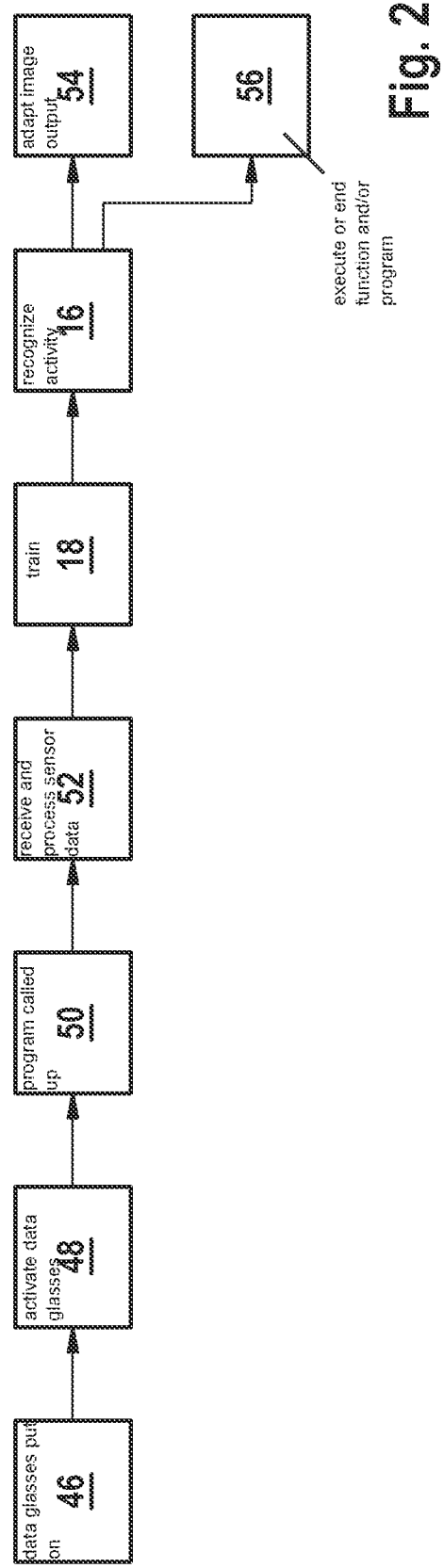

METHOD FOR A USER ACTIVITY RECOGNITION FOR DATA GLASSES, AND DATA GLASSES

CROSS REFERENCE

The present application claims the benefit under 35 U.S.C. § 119 of German Patent Application No. DE 10 2022 201 351.4 filed on Feb. 9, 2022, which is expressly incorporated herein by reference in its entirety.

BACKGROUND INFORMATION

A method for a user activity recognition for data glasses, including data glasses that include at least one integrated sensor unit, have already been provided in the related art, an activity of a user of the data glasses being recognized, via an evaluation of data that are detected by the integrated sensor unit, in at least one user activity recognition step carried out by a classifying unit.

SUMMARY

The present invention is directed to a preferably user-customized method, in particular computer-implemented method, for a user activity recognition for data glasses, including data glasses that include at least one integrated sensor unit, an activity of a user of the data glasses being recognized, via an evaluation of data that are detected by the integrated sensor unit, in at least one user activity recognition step carried out by a classifying unit.

According to an example embodiment of the present invention, it is provided that when the user activity recognition step is carried out, the classifying unit takes into account pieces of information that have been ascertained in a preferably user-specific training step, which in particular chronologically precedes the user activity recognition step, by training the classifying unit. A particularly reliable and precise user activity recognition may be advantageously achieved in this way. An activity recognition may advantageously be precisely tailored to a particular user. When user activities are ascertained, user-specific behaviors and the like may advantageously also be taken into account. A particularly high level of user convenience may advantageously be achieved. In addition, particularly high everyday suitability and/or traffic safety for data glasses may advantageously be achieved.

"Data glasses" are understood in particular to mean a wearable (head-mounted display) with the aid of which information may be added to the visual field of a user. Data glasses preferably allow augmented reality and/or mixed reality applications. Data glasses are generally also referred to as smart glasses. The sensor unit may include one or multiple sensors of the same or different type. For example, the sensor unit may include an eye tracking sensor, one or multiple microphones, one or multiple inertial sensors (gyrosensors or the like), in particular for carrying out head tracking, a navigation module (GPS or the like), one or multiple cameras, etc. The sensors of the sensor unit may, for example, be at least partially integrated into an eyeglass frame of the data glasses or fastened to the eyeglass frame or to the eyeglass lenses of the data glasses. In addition, an image generation unit of the data glasses via which the images are introduced into the visual field of the user (a laser projector unit, for example) may be situated, at least in part, in the eyeglass frame of the data glasses. In particular, the data glasses include a control and/or regulation unit that is provided at least for managing (for example, obtaining and preprocessing) the data of the sensors, controlling the output of the image data, and/or organizing a communication with the surroundings or the internet (via WLAN or mobile radio protocols, for example). A "control and/or regulation unit" is understood in particular to mean a unit that includes at least one control electronics system. A "control electronics system" is understood in particular to mean a unit that includes a processor and a memory as well as an operating program that is stored in the memory. It is possible for the control and/or regulation unit to have a one-piece design with the classifying unit, or to communicate at least with a classifying unit that is designed separately from the control and/or regulation unit, in particular even separately from the data glasses. In particular, the data glasses are provided for continually learning/for continually training the classifying unit, in particular whenever, in addition to the internal sensor data that are detected by the sensor unit, specifically external sensor data are available which preferably allow conclusions to be drawn concerning an activity being carried out at the moment. After the user-specific training, it is advantageous that the recognition/classification of activities may reliably take place without external data. "Provided" is understood in particular to mean specially programmed, designed, and/or equipped. The statement that "an object is provided for a certain function" is understood in particular to mean that the object fulfills and/or carries out this certain function in at least one use state and/or operating state.

Furthermore, according to an example embodiment of the present invention, it is provided that in the training step, the classifying unit is trained with the aid of measured data, in particular by an evaluation of measured data of at least one external sensor that is associated with the user and designed separate from the data glasses. A user activity recognition may be advantageously optimized in this way. A high coverage of activities and/or a high classification accuracy may be advantageously achieved. A particularly large reservoir of sensor data for training the classifying unit may be advantageously provided. A simple and/or lightweight design of the data glasses may advantageously be made possible. The energy requirements of the data glasses may advantageously be kept low. The external sensor may in particular be part of a preferably portable computer/sensor system. The external sensor is in particular designed and situated separately from the data glasses. The external sensor may monitor the user or the user surroundings. The external sensor may at least partially follow the user or movements of the user. The external sensor preferably has a portable and/or mobile design. The external sensor may be associated with the user or with a system that moves along with the user, for example a vehicle. In addition, it is possible for the classifying unit to be trained with the involvement of multiple external sensors. In the training step, pieces of sensor information from multiple sources may optionally be combined for the activity recognition. In the training step, pieces of sensor information from multiple sources may optionally be combined for training the classifying unit.

If the external sensor is at least part of a smart phone, of a wearable that is different from data glasses, or of a vehicle, in particular that is associated with the user, a high level of user-friendliness may be advantageously achieved. Data of a system which the user already possesses and/or carries along anyway may advantageously be used. In particular, the so-called "ground truth" is ascertained from the external sensor data. In particular, the external sensor includes a preferably wireless data communication interface that is provided for a data exchange with the data glasses, in particular with the classifying unit of the data glasses. In particular, the external sensor may be connected to the internet.

In addition, according to an example embodiment of the present invention, it is provided that the classifying unit includes a neural network or a static classifier that is trained in the training step. The user activity recognition may be advantageously optimized in this way. The recognition of the user activity may thus be advantageously customized in a particularly effective and targeted manner. In particular, the neural network or the static classifier is trained by comparing the (reliable) activity ascertained by the external sensor (for example, recognizing a trip to a supermarket based on GPS data of the external sensor) to an activity that is ascertained by the internal sensor data. When the ascertained activities match, for example positive feedback is then provided to the classifying unit, and when the ascertained activities differ, negative feedback and/or a correction are/is provided to the classifying unit. In particular, the neural network may have an arbitrary, conventional topology. In particular, the static classifier may be designed as a naive Bayes classifier, as a nearest neighbor classifier, as a decision tree classifier, as a support vector machine, or as a further suitable static classification method.

Furthermore, according to an example embodiment of the present invention, it is provided that in the training step, user context information used for validating the present activity, determined at the same time by the classifying unit from the measured data of the integrated sensor unit, is ascertained from the sensor data of the external sensor. The user activity recognition may be advantageously optimized in this way. The recognition of the user activity may thus be advantageously customized in a particularly effective and targeted manner. In particular, data obtained by the external sensor via the internet connection may also be understood as external sensor data. For example, a stay in a reception range of a certain WLAN network, for example of an airport or train station, may deliver usable context information. The user context information ascertained from the external sensor data may then be used, for example, as "labels" for the internal sensor data. Based on an ascertainment of similar internal sensor data in the future, a renewed performance of the activity may be deduced without the absolute need for external sensor data.

Moreover, according to an example embodiment of the present invention, it is provided that in the training step, the classifying unit is trained with the aid of/by an evaluation of the functions and/or programs of the data glasses and/or of the external sensor that are executed by the user. The user activity recognition may be advantageously optimized in this way. The recognition of the user activity may thus be advantageously customized in a particularly effective and targeted manner. For example, if the user uses an integrated street navigation app of a smart phone, or if the user has linked his/her smart phone to the automobile, the activity "driving a car" may be deduced. The data glasses subsequently collect internal sensor data from the integrated sensors in order to learn this activity and re-recognize it in the future. In this regard, the context information is used in particular as labels for the internal sensor data recorded by the data glasses. The activity may subsequently be advantageously recognized solely from the internal sensor data, even if the additional context information is lacking (for example, the street navigation app is not used). A further exemplary embodiment is the use of a GPS sensor and map material in a smart phone that communicates with the data glasses in order to ascertain the position of a user and to supplement it with context information, for example to identify whether the user is present in a supermarket. This context information could then be employed to use the recorded internal sensor data of the data glasses to add the label "shopping," or to train the classifying unit to recognize the activity "shopping." Internal sensor data that could be linked to the activity "shopping" are certain typical sounds such as the beeping of a checkout register or the humming of a cooler or typical head and/or eye movements that result when goods on a shelf are being observed/searched for. The activity "shopping" could also be linked to the data glasses via the external sensor by calling up, for example, a shopping list or a piece of product information.

When in addition the user activity recognition step and/or the training step are/is carried out at least independently of any world camera that is connected, in particular physically, to the data glasses, low energy consumption may be advantageously achieved. In addition, acceptance of the data glasses in public spaces may advantageously be increased. In particular, the user activity recognition step and/or the training step are/is carried out at least independently of any camera sensor that is connected to the data glasses.

In addition, according to an example embodiment of the present invention, it is provided that the classifying unit is integrated into the data glasses, for example as part of the control and/or regulation unit, or that the classifying unit is executed, at least in part, in a cloud. In this way, particularly energy-efficient operation of the data glasses may advantageously be made possible. For example, the training of the neural network and/or of the static classifier, and/or the evaluation of the internal sensor data, may take place in the cloud. For example, the internal sensor data may be transferred to the cloud, a classification may then be made in the cloud based on these data, and a result of the classification may be sent back to the data glasses.

Furthermore, according to an example embodiment of the present invention, it is provided that an image output that is displayed by an output unit of the data glasses is adapted as a function of the user activity ascertained in the user activity recognition step, and/or that a certain function and/or a certain program of the data glasses are/is executed and/or ended, based on the user activity ascertained in the user activity recognition step. User convenience may thus be advantageously improved. Increased everyday suitability of the data glasses may be advantageously achieved. In particular, the output unit of the data glasses may be designed as a virtual retinal scan display (RSD) or as some other display technology that is suitable for use in data glasses. In particular, a position of the image output in the visual field of a user of the data glasses may be adapted as a function of the user activity ascertained in the user activity recognition step. For example, if the user activity "driving a car" is recognized, no images are generated in the center of the visual field. In particular, a position of the image output in the visual field of a user of the data glasses may be adapted as a function of the user activity ascertained in the user activity recognition step. In particular, a program that is called up in the visual field of a user of the data glasses may be retrieved, executed, or preset as a function of the user activity ascertained in the user activity recognition step. For example, if the user activity "shopping" is recognized, shopping aids such as shopping lists, directions, prices, etc., are then projected into the visual field of the user. In particular, a display content displayed in the visual field of a user of the data glasses may be adapted as a function of the user activity ascertained in the user activity recognition step.

In addition, according to an example embodiment of the present invention, the data glasses including the integrated sensor unit, as well as a system including the data glasses and the at least one external sensor that communicates with the data glasses, are provided. A particularly high level of user convenience may advantageously be achieved in this way. In addition, particularly high everyday suitability and/or traffic safety for data glasses may advantageously be achieved.

The method according to the present invention, the data glasses according to the present invention, and the system according to the present invention are not intended to be limited to the application and specific embodiment(s) described above. In particular, for fulfilling a mode of operation described herein, the method according to the present invention, the data glasses according to the present invention, and the system according to the present invention may include a number of individual elements, components, and units as well as method steps that differ from the number stated herein. In addition, for the value ranges given in the present disclosure, values within the stated limits are also considered to be disclosed and usable as desired.

BRIEF DESCRIPTION OF THE DRAWINGS

Further advantages result from the following description of the figures. One exemplary embodiment of the present invention is illustrated in the figures. The figures and the description contain numerous features in combination. Those skilled in the art will also advantageously consider the features individually and combine them into further meaningful combinations.

FIG. 1 shows a schematic illustration of a system including data glasses and an external sensor, according to an example embodiment of the present invention.

FIG. 2 shows a schematic flowchart of a method for a user activity recognition for data glasses, according to an example embodiment of the present invention.

DETAILED DESCRIPTION OF EXAMPLE EMBODIMENTS

FIG. 1 shows a system 26 that includes data glasses 10. Data glasses 10 include an eyeglass frame 28. Data glasses 10 include eyeglass lenses 30, 30'. Data glasses 10 include an output unit 24. Output unit 24 is provided for outputting an image into a visual field of a user/wearer of data glasses 10. Output unit 24 is designed as a retinal scan display. Output unit 24 includes a projector unit 32. Projector unit 32 generates a scanned laser beam which, via interaction with an optical element (for example, a holographic optical element (HOE), not illustrated) that is integrated into at least one of eyeglass lenses 30, 30', generates the image directly onto the retina of a user's eye. Data glasses 10 include a sensor unit 12. Sensor unit 12 is at least partially integrated into data glasses 10/into eyeglass frame 28. Sensor unit 12 includes an eye tracking sensor 34. Sensor unit 12 includes a microphone 36. Sensor unit 12 includes an inertial sensor 38. Inertial sensor 38 is used as a head tracking sensor. Sensor unit 12 includes a GPS module 40.

Data glasses 10 include a cellular module 42. Cellular module 42 is provided to establish and/or manage a wireless data link to the outside. Cellular module 42 is provided to establish wireless connections to external sensors 20 and/or a cloud 22 of system 26. Cellular module 42 is designed as a mobile radio module that communicates with the outside, for example with the aid of a mobile radio protocol such as GPRS. Alternative or additional communication protocols such as Bluetooth, WLAN, etc., are possible. Data glasses 10 include a control and/or regulation unit 44. Control and/or regulation unit 44 is provided to receive the measured data of sensor unit 12. Control and/or regulation unit 44 is provided to send the measured data of sensor unit 12. Control and/or regulation unit 44 is provided to at least partially process the measured data of sensor unit 12. Control and/or regulation unit 44 is provided to control the communication of cellular module 42. Control and/or regulation unit 44 is provided to control projector unit 32. Control and/or regulation unit 44 is provided to control output unit 24. Control and/or regulation unit 44 is provided call-up and/or control programs whose outputs are displayable via output unit 24. It is possible for control and/or regulation unit 44 to be made up of multiple individual processing units or controllers. In addition, it is possible for individual electronic components of data glasses 10 to have their own controllers, which in particular are interlinked with one another or with a central control and/or regulation unit 44. Control and/or regulation unit 44 includes a classifying unit 14. Classifying unit 14 is provided to identify various user activities.

System 26 includes an external sensor 20. External sensor 20 is designed separately from data glasses 10. Data glasses 10 communicate with external sensor 20. External sensor 20 is at least part of an external device 58, such as a smart phone, a wearable, or a vehicle that is associated with the user. External sensor 20 is a sensor contained in device 58 that is associated with the user, for example a GPS sensor, a position sensor, an acceleration sensor, a camera sensor, a microphone, a brightness sensor, a rain sensor, etc. System 26 includes cloud 22. Cellular module 42 is provided to communicate with external sensor 20. Cellular module 42 is provided to receive sensor data of external sensor 20 and preferably to relay them to classifying unit 14. Cellular module 42 is provided to request sensor data from external sensor 20. Cellular module 42 is provided to recognize the presence of external sensors 20 and to automatically establish and/or disconnect data links if necessary. Control and/or regulation unit 44 is provided to extract, based on the sensor data of sensor unit 12, features that may be subsequently used for classifying user activities, the sensor data of external sensors 20 being used for optimizing and/or confirming the particular classifications. Data glasses 10, in particular sensor unit 12 of data glasses 10, are/is free of any camera sensors. Alternatively, however, data glasses 10 including an integrated world camera are also possible.

FIG. 2 shows a schematic flowchart of a method for a user activity recognition for data glasses 10. Data glasses 10 are put on by the user in at least one method step 46. Data glasses 10 are activated in at least one method step 48. A program is called up by data glasses 10 in at least one method step 50. The program generates an image output for output unit 24 in method step 50. The generated image is output by output unit 24 in method step 50. Sensor data of sensor unit 12 are received from classifying unit 14 and processed in at least one method step 52. Classifying unit 14 is trained in a training step 18. Classifying unit 14 is trained in training step 18 with the aid of the measured data of external sensor 20, which is associated with the user and designed separate from data glasses 10. Classifying unit 14 includes a neural network or a static classifier that is trained in training step 18. The neural network/the static classifier is provided to recognize patterns in the received sensor data of sensor unit 12 and to associate them with certain user activities. The sensor data of external sensor 20 are used in training step 18 to validate the user activities ascertained by the neural network or by the static classifier, and thus in particular to optimize the user activity recognition via feedback. For this purpose, user context information is ascertained in training step 18 from the sensor data of external sensor 20, and in turn is then used for validating the present activity that is determined at the same time by classifying unit 14, based on the measured data of the integrated sensor unit 12. Alternatively or additionally, the functions and/or programs of data glasses 10 executed by the user are used to train classifying unit 14 in training step 18. The objective of training step 18 is thus to enable the recognition of the user activity, reliably and coordinated in a user-specific manner, strictly from the sensor data ascertained internally by sensor unit 12, even without the presence of external sensor data. Training step 18 is carried out independently of any world camera that is physically connected to data glasses 10. Training step 18 may be carried out completely by control and/or regulation unit 44 of data glasses 10, or at least partially in cloud 22.

An activity of the user of data glasses 10 is recognized in at least one user activity recognition step 16 with the aid of an evaluation (solely) of the data that are detected by integrated sensor unit 12. User activity recognition step 16 is carried out by classifying unit 14. User activity recognition step 16 is carried out independently of any world camera that is physically connected to data glasses 10. When user activity recognition step 16 is carried out, classifying unit 14 takes into account information that has been ascertained in user-specific training step 18 chronologically preceding user activity recognition step 16, by training classifying unit 14. User activity recognition step 16 may be carried out completely by control and/or regulation unit 44 of data glasses 10, or at least partially in cloud 22.

The image output displayed by output unit 24 of data glasses 10 is adapted in at least one further method step 54 as a function of the user activity ascertained in user activity recognition step 16. A certain function and/or a certain program of data glasses 10 are/is executed and/or ended in at least one further method step 56, based on the user activity ascertained in user activity recognition step 16.

What is claimed is:

1. A method for a user activity recognition for data glasses, the data glasses including at least one integrated sensor unit, the method comprising the following steps:
    recognizing, in at least one user activity recognizing steps carried out by a classifying unit, an activity of a user of the data glasses, via an evaluation of data that are detected by the integrated sensor unit;
    wherein when the user activity recognition step is carried out, the classifying unit takes into account information that has been ascertained in a user-specific training step chronologically preceding the user activity recognition step, by training the classifying unit.

2. The method as recited in claim 1, wherein in the training step, the classifying unit is trained using measured data of at least one external sensor that is associated with the user and separate from the data glasses.

3. The method as recited in claim 2, wherein the external sensor is at least part of a smart phone or a wearable or a vehicle that is associated with the user.

4. The method as recited in claim 2, wherein in the training step, user context information used for validating the present activity, determined at the same time by the classifying unit from the measured data of the integrated sensor unit, is ascertained from the sensor data of the external sensor.

5. The method as recited in claim 1, wherein the classifying unit includes a neural network or a static classifier that is trained in the training step.

6. The method as recited in claim 1, wherein in the training step, the classifying unit is trained using functions and/or programs of the data glasses that are executed by the user.

7. The method as recited in claim 1, wherein the user activity recognition step and/or the training step, is carried out at least independently of any world camera that is physically connected to the data glasses.

8. The method as recited in claim 1, wherein the classifying unit is integrated into the data glasses, or the classifying unit is executed, at least in part, in a cloud.

9. The method as recited in claim 1, wherein: (i) an image output that is displayed by an output unit of the data glasses is adapted as a function of the user activity ascertained in the user activity recognition step, and/or (ii) a certain function and/or a certain program of the data glasses is executed and/or ended, based on the user activity ascertained in the user activity recognition step.

10. Data glasses including at least one integrated sensor unit, the data glasses configured to recognize a user activity, the data glass being configured to:
    recognize, in at least one user activity recognizing steps carried out by a classifying unit, an activity of a user of the data glasses, via an evaluation of data that are detected by the integrated sensor unit;
    wherein when the user activity recognition step is carried out, the classifying unit takes into account information that has been ascertained in a user-specific training step chronologically preceding the user activity recognition step, by training the classifying unit.

11. A system, comprising:
    data glasses including at least one integrated sensor unit, the data glasses configured to recognize a user activity, the data glass being configured to:
        recognize, in at least one user activity recognizing steps carried out by a classifying unit, an activity of a user of the data glasses, via an evaluation of data that are detected by the integrated sensor unit;
        wherein when the user activity recognition step is carried out, the classifying unit takes into account information that has been ascertained in a user-specific training step chronologically preceding the user activity recognition step, by training the classifying unit; and
    at least one external sensor that communicates with the data glasses, wherein in the training step, the classifying unit is trained using measured data of the at least one external sensor.

* * * * *